3,094,257
LOAD-CARRYING ATTACHMENTS FOR BICYCLES AND SIMILAR VEHICLES
Lucian Wade Hampton, 317 SE. 24th Ave., Portland, Oreg.
Filed Sept. 1, 1961, Ser. No. 135,641
1 Claim. (Cl. 224—42)

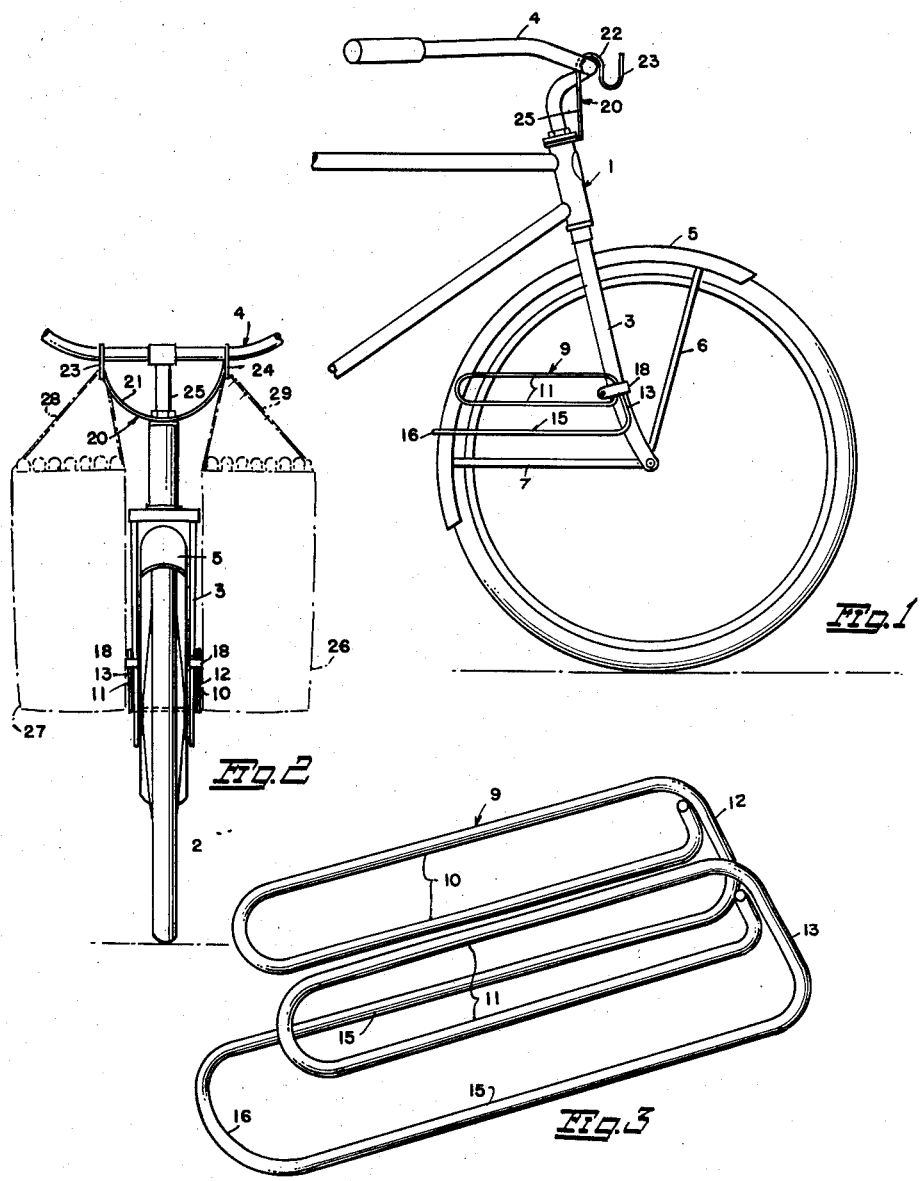

This invention relates to improvements in load-carrying attachments for bicycles, motorcycles, and the like, and more particularly to carriers for loaded paper bags as used by paper delivery boys.

It is one of the principal objects of the invention to provide an attachment of this character, made of two parts, one removably attachable to the handlebars of a bicycle, and the other to the front wheel fork thereof, whereby two loaded bags may be securely held in a balanced position with respect to the bicycle and whereby the bags when empty may be conveniently removed from the bicycle.

A further object of the invention is the provision of a carrier of this character which will maintain and distribute the load on both sides of the front wheel of the bicycle, or other vehicle to which it is attached.

The foregoing and other objects and advantages which will become subsequently apparent reside in the details of construction and operation as more fully hereinafter described and claimed, reference being had to the accompanying drawing forming a part hereof and in which:

FIGURE 1 is a fragmentary side elevational view of the forward end of a bicycle showing attachments applied thereto made in accordance with my invention.

FIGURE 2 is a fragmentary front elevational view of FIGURE 1.

FIGURE 3 is a perspective detail view of a guard for attachment to the front wheel fork of the bicycle.

With continuing reference to the drawing wherein like references of character designate like parts reference numeral 1 indicates generally a conventional bicycle having a steerable front wheel 2 rotatably mounted in the bottom end of a fork 3 whose top end is attached to handlebars 4, and a mud guard 5 is secured by braces 6 and 7 to the bottom of the fork 3 all in the conventional manner.

The guard, in the form of a frame indicated generally at 9, comprises a single length of rod material bent into two rearwardly extending vertically disposed parallel side portions 10 and 11, two forwardly and downwardly extending front portions 12 and 13 and a rearwardly extending horizontal bottom portion 15 adapted at its rearward end 16 to embrace the lower rearward portion of the mud guard 5 when the frame 9 is secured to the fork 3 by a clamp 18 encircling the fork and the front end portions 12 and 13 of the frame 9.

A bag hanger, indicated generally at 20 in FIGURES 1 and 2, comprises a generally U-shaped central portion 21 whose top ends are turned downwardly as at 22 over the handlebars 4 then upwardly to provide hook members 23 and 24 equidistantly spaced on opposite sides of the steering column 25.

From the foregoing, and as illustrated in broken lines in FIGURE 2, it will be apparent that the bottom end portions of two bags 26 and 27 loaded with newspapers and suspended from the hook members 23 and 24 by their handles 28 and 29, respectively, will gravitate against the side portions 10 and 11 and the sides 15 of the frame 9 because of the greater distance between the hook members 23 and 24 than the spacing between said side and bottom portions of the frame 9.

The combined load of both bags will thus be maintained in a substantially balanced condition as long as the papers are withdrawn alternately from the bags 26 and 27, and the bottom portions of the bags will be protected against damaging contact with the spokes of the front wheel by the guard 9.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

An attachment suspending two loaded carrying bags from a bicycle one disposed on each side of the front wheel thereof,
   said bicycle having handle bars, a front wheel, a steering fork and fender for the wheel,
   each of said bags having a strap handle,
   said attachment comprising in combination a pair of forwardly extending upwardly opening spaced apart integrated hook members attached to said handle bars, one hook member being on each side of the front wheel and in inwardly off-center hooked engagement with said bag handles,
   a guard comprising a unitary frame attached at its forward end to said fork near the bottom end thereof extending rearwardly therefrom and embracing said fender,
   and the spacing between said hook members being greater than the width of said guard,
   whereby the bottom portions of said bags so suspended from said hook members will gravitationally bear against said guard on both sides thereof.

References Cited in the file of this patent

UNITED STATES PATENTS

| | | |
|---|---|---|
| 561,330 | Ljungstrom | June 2, 1896 |
| 637,762 | Buley et al. | Nov. 28, 1899 |

FOREIGN PATENTS

| | | |
|---|---|---|
| 450,130 | Italy | July 8, 1949 |
| 877,974 | France | Sept. 21, 1942 |